No. 680,424. Patented Aug. 13, 1901.
A. BENSON.
HUB FOR VEHICLE WHEELS.
(Application filed Nov. 20, 1899.)
(No Model.)
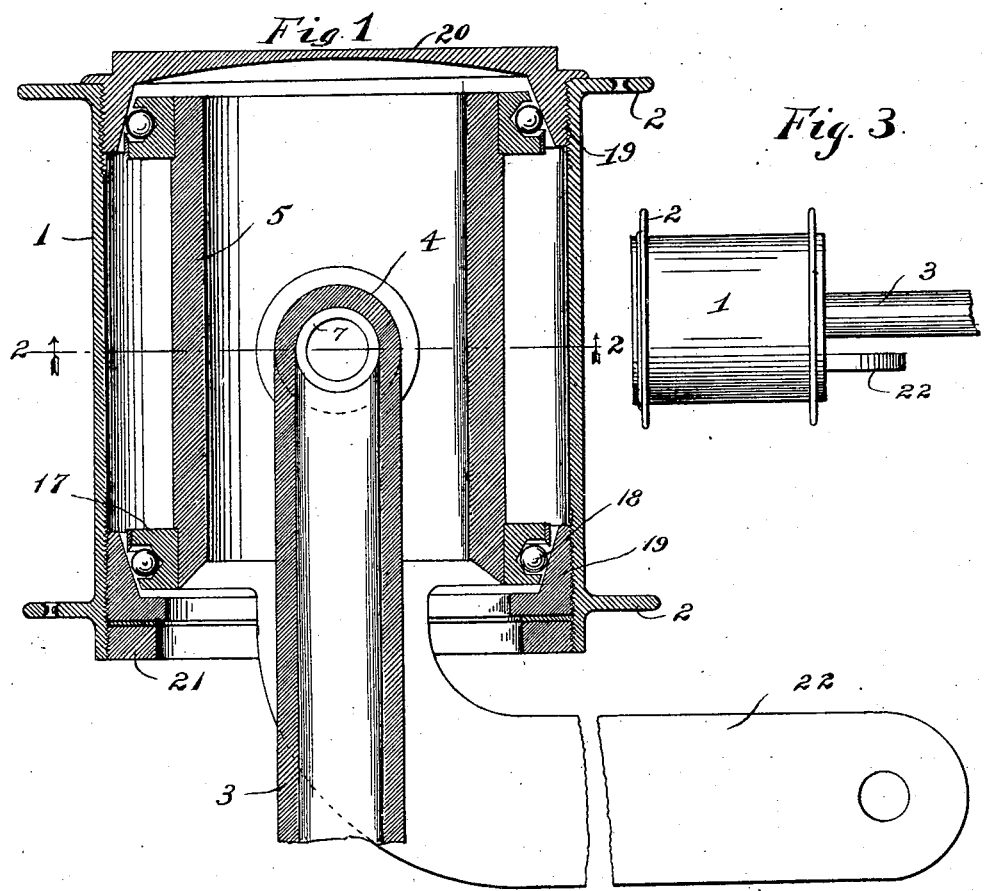
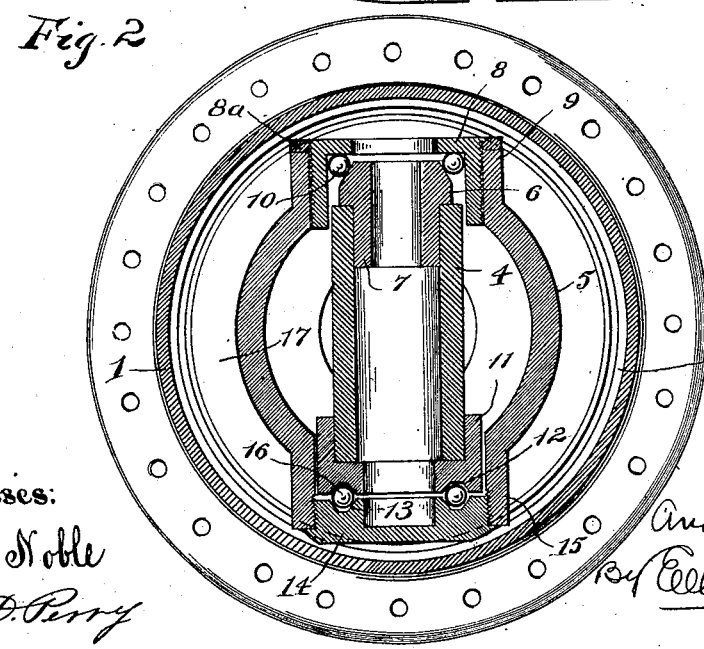
Witnesses:
G. S. Noble
Ira D. Perry
Inventor,
Andrew Benson
By Elliott Hopkins
Att'ys.

UNITED STATES PATENT OFFICE.

ANDREW BENSON, OF CHICAGO, ILLINOIS, ASSIGNOR OF THREE-FOURTHS TO JOHN P. PRICE AND ROBERT P. PRICE, OF SAME PLACE, AND JOHN B. BENSON.

HUB FOR VEHICLE-WHEELS.

SPECIFICATION forming part of Letters Patent No. 680,424, dated August 13, 1901.

Application filed November 20, 1899. Serial No. 737,588. (No model.)

*To all whom it may concern:*

Be it known that I, ANDREW BENSON, a citizen of the United States, residing at Chicago, in the county of Cook and State of Illinois, have invented certain new and useful Improvements in Hubs for Vehicle-Wheels, of which the following is a full, clear, and exact specification.

My invention relates more particularly to hubs for the steering-wheels of motor-vehicles and to that class in which the wheel is pivoted to the axle on a vertical axis. One of the great objections to steering-wheels of this character is that the joint between the axle-spindle and the axle is located to one side of the central support, and as a consequence a tendency is produced to dish the wheels or bend the axle at the joint, to say nothing of accidents from the breakage of the axle at the pivotal point.

My invention has for its primary object, therefore, to provide improved and simple means whereby the pivotal point between the axle-spindle and the axle may be arranged at the mid-length of the hub or directly over the center of the wheel, whereby the tendency of the wheel to dish or lean will be absolutely prevented.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claim.

In the said drawings, Figure 1 is a longitudinal sectional view of a hub for vehicle-wheels embodying my invention. Fig. 2 is a transverse sectional view thereof, taken on the line 2 2, Fig. 1; and Fig. 3 is a side elevation.

In the accompanying drawings I have shown a hub adapted for wire spokes; but it will nevertheless be understood that my invention is applicable to spokes of any desired form.

1 represents the hub-barrel, which when adapted for wire spokes may be provided at each end with a perforated flange 2 for the attachment of the spokes, and 3 represents the axle, which may be of the usual or any suitable construction, excepting that with my invention the outer end of the axle is provided with a vertically-arranged bearing or sleeve 4, rigidly secured to the axle and pivoted on a vertical axis directly in the center of the hub. In order to provide for the accommodation of this bearing or sleeve 4, the interior box 5 of the hub is made larger than usual, so as to permit the hub to turn on the aforesaid vertical axis without interference from the axle 3. This box 5 is also provided at its mid-length with means for supporting and holding suitable antifriction-bearings for the sleeve 4, in the upper end of which latter is arranged a bearing-cone 6, having a stem 7, secured in the sleeve 4 and surrounded by a ball-cup 8, which is secured in a collar 9, formed in the upper side of the inner box 5, suitable antifriction rollers or balls 10 being interposed between the cup 8 and the cone 6. The lower end of the sleeve 4 is seated in a cup 11, in the bottom of which is formed a ball-race 12, which is opposed by a similar ball-race 13, formed in a cup 14, which is screwed into a collar 15, formed at the bottom of the box 5 opposite the collar 9, balls or rollers 16 being interposed between the cups 11 14. Thus it will be seen that the sleeve 4 is provided with a vertical axis at the center of the hub and directly over the center of the wheel, so that all tendency of the wheel to tip in either direction is absolutely prevented.

The inner box 5 of the hub serves as a spindle or journal for the barrel 1 to revolve on, and to the end that the friction may be relieved I provide each end of the box 5 with a ball-race 17, which surrounds it and contains a series of balls or rollers 18, bearing against annular cones 19, screwed into the ends of the barrel 1, the outer one of these cones being provided with a cap 20, which closes the end of the hub. The cone 19 is held in place by a threaded ring 21, screwed in the inner end of the barrel 1.

The steering attachment, (not shown,) which may be of any suitable construction, is connected to an arm or lever 22, formed on or secured to the inner end of the box 5, so that by oscillating the lever 22 the box 5, and consequently the entire hub, will be turned on the vertical axis of the bearing-sleeve 4 for changing the course of the vehicle.

Having thus described my invention, what I claim as new therein, and desire to secure by Letters Patent, is—

The combination with an axle of a bearing 4 arranged vertically thereon, the bearing-cone 7 socketed in the upper end of said bearing, the cup 11 in which the lower end of said bearing is seated, a box containing said bearing and having the collars 9 15, ball-cups having antifriction-rollers secured in said collars respectively and engaging with said cone and cup, means for oscillating said box on said bearing and a barrel journaled on said box and adapted to form part of a wheel, substantially as set forth.

ANDREW BENSON.

Witnesses:
EDNA B. JOHNSON,
F. A. HOPKINS.